US012780561B2

(12) United States Patent
Rojas et al.

(10) Patent No.: US 12,780,561 B2
(45) Date of Patent: Nov. 3, 2026

(54) INDUCTION BOARD FOR A CONVEYOR SYSTEM

(71) Applicant: Intelligrated Headquarters, LLC, Mason, OH (US)

(72) Inventors: Estefania Rojas, Mexico City (MX); Pamela Lizbeth Juarez, Mexico City (MX)

(73) Assignee: Intelligrated Headquarters, LLC, Mason, OH (US)

( * ) Notice: Subject to any disclaimer, the term of this patent is extended or adjusted under 35 U.S.C. 154(b) by 20 days.

(21) Appl. No.: 18/772,566

(22) Filed: Jul. 15, 2024

(65) Prior Publication Data

US 2026/0015182 A1 Jan. 15, 2026

(51) Int. Cl.
*B65G 47/02* (2006.01)

(52) U.S. Cl.
CPC .................................... *B65G 47/02* (2013.01)

(58) Field of Classification Search
None
See application file for complete search history.

(56) References Cited

U.S. PATENT DOCUMENTS 4,205,781 A 6/1980 Baader
4,711,045 A 12/1987 Specht
4,909,697 A * 3/1990 Bernard, II .......... B65G 1/1378 198/463.3
7,809,467 B2 * 10/2010 Schaefer .............. B65G 1/1378 700/216
8,713,899 B2 * 5/2014 Hortig .................... B65G 67/02 414/280
8,952,568 B2 2/2015 Malina et al.
9,771,222 B2 9/2017 Schroader
10,150,626 B2 * 12/2018 Eisenberg .............. B65G 47/46
10,807,809 B1 * 10/2020 Deboer .................. B65G 47/66
2004/0253082 A1 * 12/2004 Mathys ................ B65G 1/1378 414/280

(Continued)

FOREIGN PATENT DOCUMENTS

CN 100497991 C 6/2009
CN 101844659 A 9/2010

(Continued)

OTHER PUBLICATIONS

Extended European Search Report Mailed on Nov. 26, 2025 for EP Application No. 25182289, 10 page(s).

*Primary Examiner* — Gene O Crawford
*Assistant Examiner* — Muhammad Awais
(74) *Attorney, Agent, or Firm* — Alston & Bird LLP

(57) ABSTRACT

An induction board for a conveyor system is disclosed. The induction board comprising a first side fabricated with a plurality of angled sides. Each of the plurality of angled sides having a first sloped edge. A second side having a second sloped edge and a third side having a third sloped edge. A fourth side is positioned opposite to the first side and having a fourth sloped edge. The plurality of angled sides of the first side allows a user to receive or place one or more packages from or on the conveyor system from the second side, the third side, or the fourth side. The first sloped edge of each of the angled sides, the second sloped edge, the third sloped edge, and the fourth sloped edge provides a smooth transition of the one or more packages from or off the induction board.

20 Claims, 13 Drawing Sheets

(56) References Cited

U.S. PATENT DOCUMENTS

| | | | | |
|---|---|---|---|---|
| 2017/0225893 | A1 * | 8/2017 | Stevens | B65G 1/1378 |
| 2023/0278808 | A1 * | 9/2023 | Pettinga | B65G 47/66 198/600 |

FOREIGN PATENT DOCUMENTS

| | | | | | |
|---|---|---|---|---|---|
| CN | 219372127 | U | | 7/2023 | |
| CN | 220006551 | U | | 11/2023 | |
| CN | 220244571 | U | | 12/2023 | |
| DE | 19946452 | A1 | | 4/2001 | |
| EP | 0847939 | A1 | * | 6/1998 | B65G 1/137 |
| WO | WO-2013053747 | A1 | * | 4/2013 | B65G 1/1378 |

* cited by examiner

INDUCTION BOARD FOR A CONVEYOR SYSTEM

TECHNOLOGICAL FIELD

Example embodiments of the present disclosure relate generally to a conveyor system, and more particularly relates to an induction board for the conveyor system.

BACKGROUND

Conveyor systems are widely used for mechanical handling equipment used across various industries to move goods, products, raw material and other materials from one location to another location within the same area or building. Conventionally, an induction mechanism was involved in handing of the one or more packages. The induction mechanism facilitates proper positioning of the one or more packages to the conveyor belt so that the one or more packages may be scanned with a top scanner of the conveyor system and for distributing the one or more packages to a destination location. However, the transferring of one or more packages may require manual effort while moving one or more packages from a loading point of the conveyor system to the conveyor system or from the conveyor system to an unloading point. The conventionally proposed design of such mechanisms may demand an operator to acquire an unnatural position while handing the one or more packages. Further, the operator often exerts more efforts due to a shape of the mechanism. Mostly known induction mechanisms have sharp edges and corners that usually hurt the operator while handing the one or more packages.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In one example embodiment, an induction board for a conveyor system is disclosed. The induction board comprising a first side fabricated with a plurality of angled sides. Further, each of the plurality of angled sides have a first sloped edge. Further, a second side having a second sloped edge and a third side having a third sloped edge. Further, the second side is parallel to the third side. Further, a fourth side is positioned opposite to the first side and the fourth side having a fourth sloped edge. Further, the fourth side connects to the second side and the third side. Further, the plurality of angled sides of the first side are configured to allow a user to receive or place one or more packages from or on the conveyor system from the second side, the third side, or the fourth side. Further, the first sloped edge of each of the angled sides of the first side, the second sloped edge of the second side, the third sloped edge of the third side, and the fourth sloped edge of the fourth side are configured to provide a smooth transition of the one or more packages from or off the induction board.

In some embodiments, the induction board defines a dimension having a length and a breadth. Further, the length corresponds to 81 centimeters (cm) and the breadth corresponds to 166 cm.

In some embodiments, the plurality of angled sides of the first side are configured to provide a plurality of positions for the user to receive or place the one or more packages. In some embodiments, the plurality of angled sides of the first side comprises a first angled side and a second angled side. Further, the first angled side and the second angled side form an angle. The angle corresponds to 130 degrees. In some embodiments, the angle formed by the first angled side and the second angled side defines a V shape.

In some embodiments, the first sloped edge of each of the angled sides of the first side are chamfered at a predefined angle, wherein the predefined angle corresponds to 50 degrees.

In some embodiments, the second side and the third side of the induction board comprises a plurality of apertures. In some embodiments, the plurality of apertures are configured to equip one or more fasteners. Further, the one or more fasteners are configured to mount the induction board with the conveyor system.

In some embodiments, the induction board is fastened at a loading point or at an unloading point of the conveyor system and the first side of the induction board is positioned over the conveyor system.

In some embodiments, the fourth side of the induction board is monolithic with an extended portion. Further, the extended portion is configured to rest over an edge of the conveyor system. In some embodiments, the extended portion is configured to enable the user to maintain a predefined distance from the conveyor system.

In another example embodiment, a conveyor system is disclosed. The conveyor system comprising a conveyor assembly having a conveyor belt and an induction board coupled to the conveyor assembly and positioned over the conveyor belt. Further, the induction board comprises a first side fabricated with a plurality of angled sides. Further, each of the plurality of angled sides have a first sloped edge. Further, a second side having a second sloped edge and a third side having a third sloped edge. Further, the second side is parallel to the third side, and a fourth side positioned opposite to the first side, the fourth side having a fourth sloped edge. Further, the fourth side connects to the second side and the third side. Further, the plurality of angled sides of the first side are configured to allow a user to receive or place one or more packages from or on the conveyor system from the second side, the third side, or the fourth side. Further, the first sloped edge of each of the angled sides of the first side, the second sloped edge of the second side, the third sloped edge of the third side, and the fourth sloped edge of the fourth side are configured to provide a smooth transition of the one or more packages from or off the induction board.

In another example embodiment, a method is disclosed. The method comprising steps of fastening an induction board at a loading point or at an unloading point of a conveyor system from a first side of the induction board. The first side of the induction board is positioned over the conveyor system. Further, the induction board comprising the first side fabricated with a plurality of angled sides. Further, each of the plurality of angled sides have a first sloped edge. Further, the induction board further comprising a second side having a second sloped edge and a third side having a third sloped edge. Further, the second side is parallel to the third side. Further, the induction board comprising a fourth side positioned opposite to the first side. The fourth side having a fourth sloped edge. Further, the fourth side connects to the second side and the third side. Further, the plurality of angled sides of the first side are configured to allow a user to receive or place one or more packages from or on the conveyor system from the second side, the third side, or the fourth side. Thereafter, the first sloped edge of each of the angled sides of the first side, the second sloped edge of the second side, the third sloped edge of the third side, and the fourth sloped edge of the fourth side are configured to provide a smooth transition of the one or more packages from or off the induction board.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRA WINGS

Having thus described certain example embodiments of the present disclosure in general terms, reference will hereinafter be made to the accompanying drawings, which are not necessarily drawn to scale, and wherein:

DETAILED DESCRIPTION

Figure 1A:
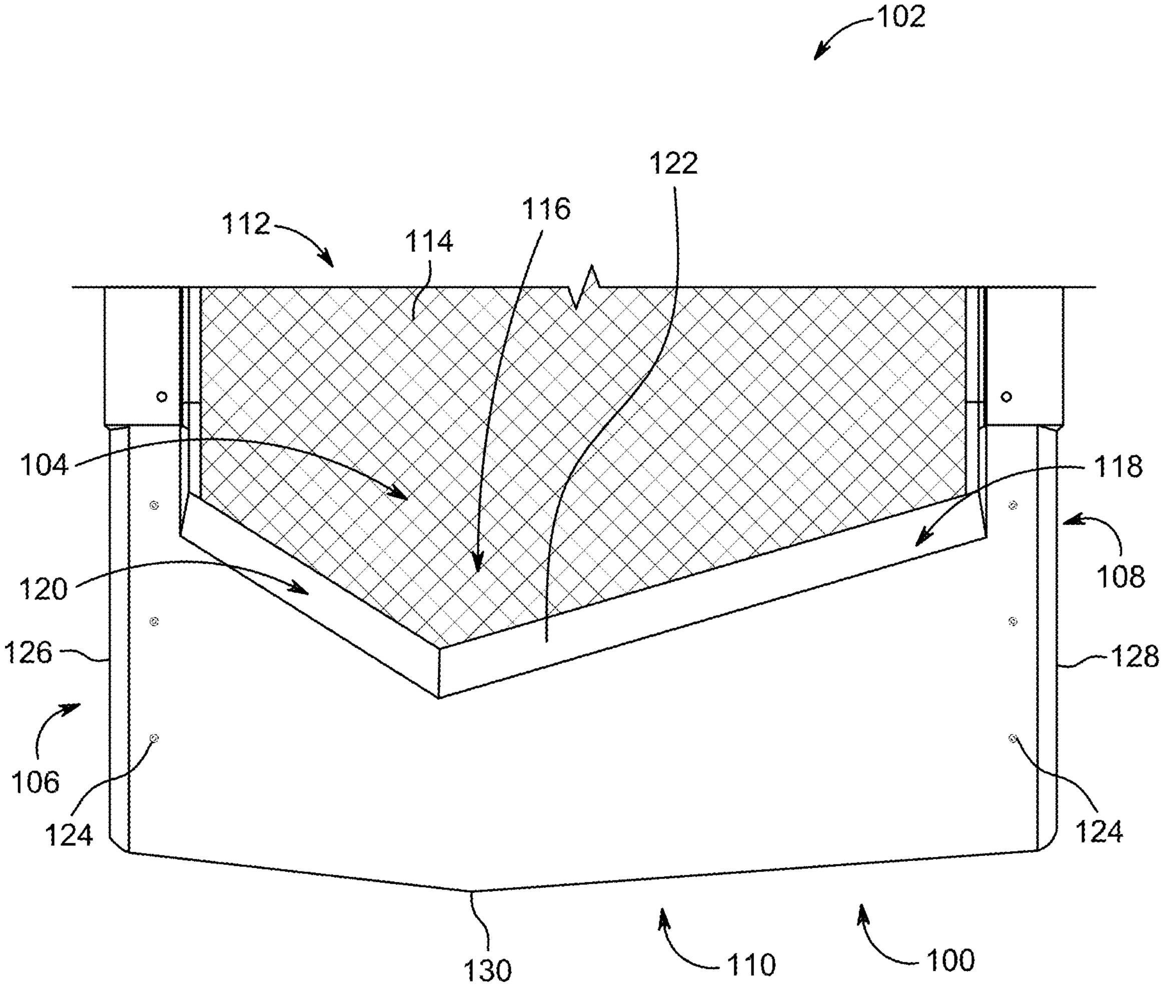
FIG. 1A illustrates a top view of a conveyor system comprising an induction board and a conveyor assembly in accordance with an example embodiment of the present disclosure.

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The present disclosure provides various embodiments of an induction board for a conveyor system. Embodiments may comprise a first side that is fabricated with a plurality of angled sides. Embodiments may comprise the first side have a first sloped edge. Embodiments may comprise a second side having a second sloped edge and a third side having a third sloped edge. The second side is parallel to the third side. Embodiments may comprise a fourth side that is positioned opposite to the first side and the fourth side having a fourth sloped edge. The fourth side connects to the second side and the third side. Embodiments may be configured to allow a user to receive or place one or more packages from or on the conveyor system from the second side, the third side, or the fourth side, using the plurality of angled sides of the first side. Embodiments may be configured to provide a smooth transition of the one or more packages from or off the induction board, using the first sloped edge of each of the angled sides of the first side, the second sloped edge of the second side, the third sloped edge of the third side, and the fourth sloped edge of the fourth side.

Figure 1B:
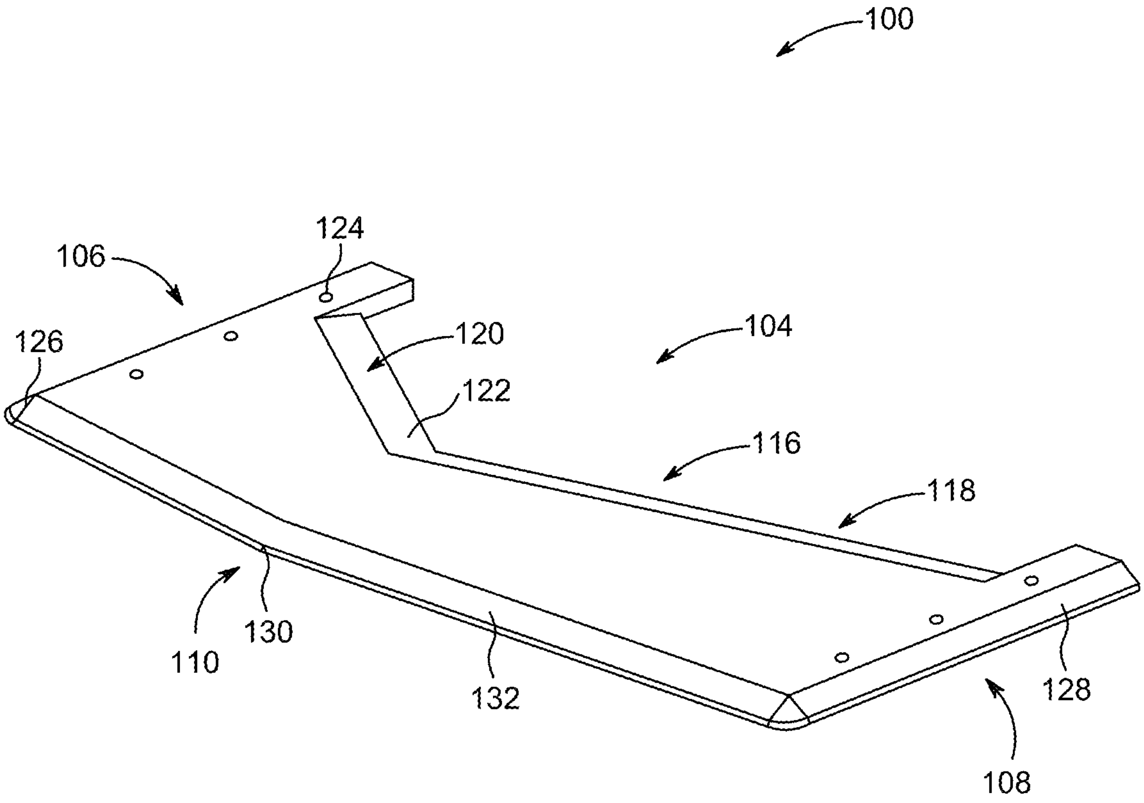
FIG. 1B illustrates an isometric top view of the induction board in accordance with an example embodiment of the present disclosure.
Figure 1C:
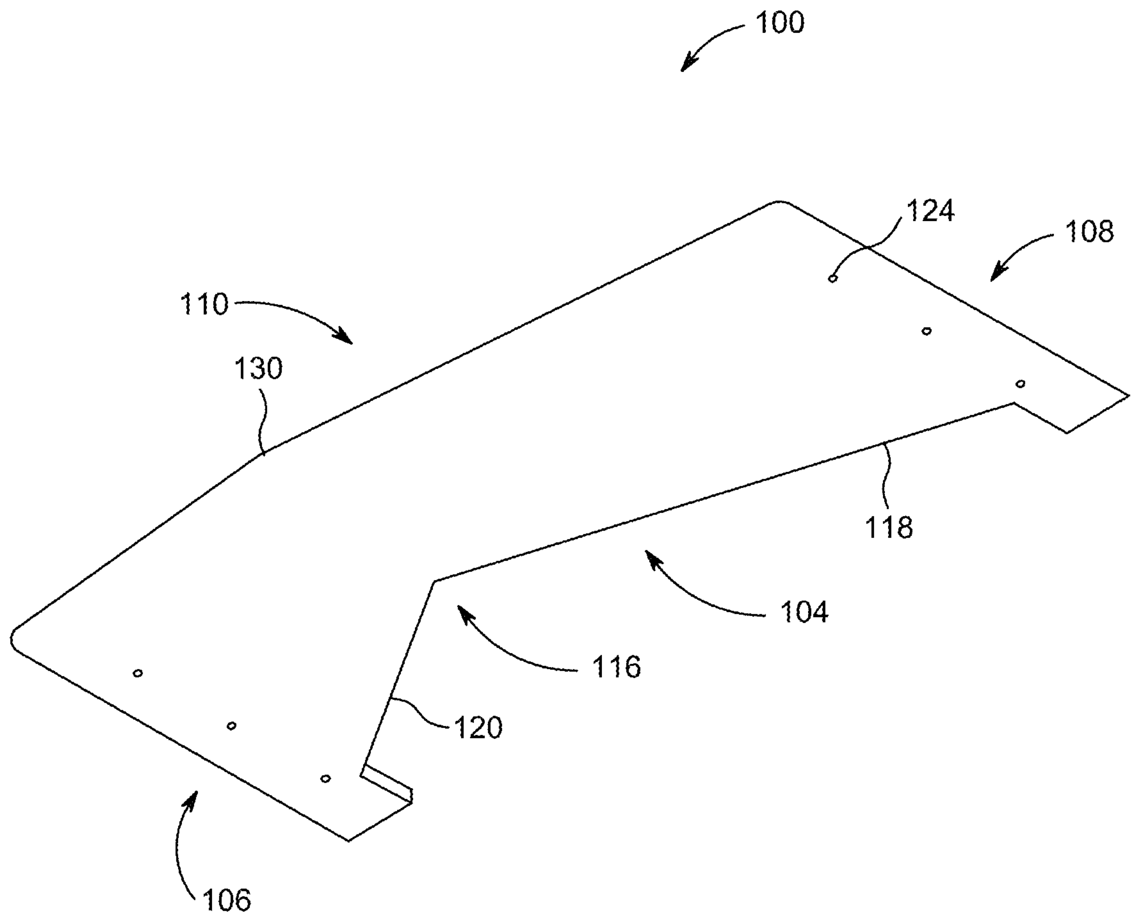
FIG. 1C illustrates an isometric bottom view of the induction board in accordance with an example embodiment of the present disclosure.
Figure 1D:
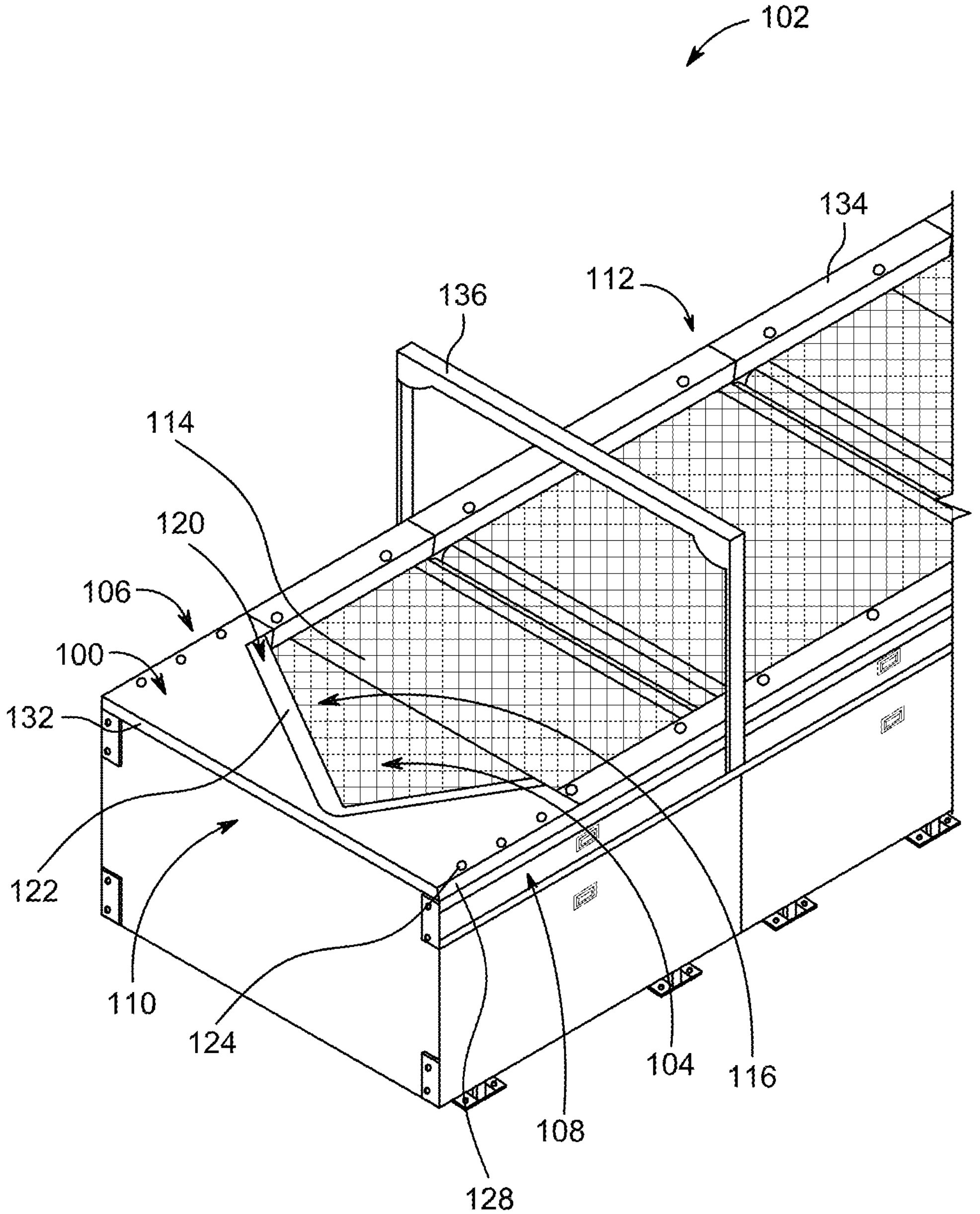
FIG. 1D illustrates an isometric view of the conveyor system in accordance with an example embodiment of the present disclosure.

FIG. 1A illustrates a top view of a conveyor system 102 comprising an induction board 100 and a conveyor assembly 112, in accordance with an example embodiment of the present disclosure. FIG. 1B illustrates an isometric top view of the induction board 100, in accordance with an example embodiment of the present disclosure. FIG. 1C illustrates an isometric bottom view of the induction board 100, in accordance with an example embodiment of the present disclosure. FIG. 1D illustrates an isometric view of the conveyor system 102, in accordance with an example embodiment of the present disclosure.

In some embodiments, the induction board 100 may comprise a first side 104, a second side 106, a third side 108, and a fourth side 110. In some embodiments, the induction board 100 may be configured to be coupled with a conveyor assembly 112 of the conveyor system 102. In some embodiments, the conveyor system 102 may be configured to transport one or more packages 200 (FIG. 2A) from one place to another. In some embodiments, the conveyor system 102 may be installed within a facility. Further, the facility may comprise at least one of a warehouse, a factory, etc. In some embodiments, the conveyor system 102 may comprise the conveyor assembly 112. Further, the conveyor assembly 112 may be configured to facilitate movement of the one or more packages 200 over a conveyor belt 114.

In some embodiments, the conveyor assembly 112 may comprise the conveyor belt 114. In some embodiments, the conveyor assembly 112 may comprise a loading point 202 (FIG. 2A) or an unloading point 300 (FIG. 3). Further, the loading point 202 of the conveyor assembly 112 may facilitate loading of the one or more packages 200 over the conveyor assembly 112. Further, the unloading point 300 of the conveyor assembly 112 may facilitate unloading of the one or more packages 200 from the conveyor assembly 112. In some embodiments, the loading point 202 of the conveyor assembly 112 may be located at an end of the conveyor assembly 112 that may facilitate placement of the one or more packages 200 over the conveyor assembly 112 of the conveyor system 102. In some embodiments, the unloading point 300 (FIG. 3) of the conveyor system 102 may be located at another end of the conveyor system 102 that may facilitate receiving of the one or more packages 200.

In one example, the induction board 100 may be coupled with the conveyor assembly 112 on or proximate to the loading point 202. In another example, the induction board 100 may be coupled with the conveyor assembly 112 on or proximate to the unloading point 300. In some embodiments, when the induction board 100 is coupled on or proximate to the loading point 202, the one or more packages 200 may by placed by a user 204 (FIG. 2A) over the induction board 100. In some embodiments, when the induction board 100 is coupled on or proximate to the unloading point 300, the one or more packages 200 may be picked by the user 204 from the induction board 100. In some embodiments, the induction board 100 may be constructed with a material that may include but not limited to a wood, stainless steel, iron, aluminum, plastic, etc. In one example, the induction board 100 may be coated with a material that may include but not limited to a polymer film, resin, etc. Further, the material may be selected such that transportation of the one or more packages 200 may not damage a surface of the induction board 100.

In some embodiments, the induction board 100 may comprise the first side 104. Further, the first side 104 of the induction board 100 may be coupled with the conveyor assembly 112 on or proximate to the loading point 202 or unloading point 300. In some embodiments, the first side 104 of the induction board 100 may correspond to a front side of the induction board 100. In some embodiments, the first side 104 of the induction board 100 may be on the loading point 202 or unloading point 300 of the conveyor assembly 112. In some embodiments, the first side 104 of the induction board 100 may be constructed with a shape that may include but not limited to a V-shape, U-shape, etc. In some embodiments, the first side 104 of the induction board 100 may be fabricated with a plurality of angled sides 116. In some embodiments, the plurality of angled sides 116 may be constructed through one or more processes such as cutting, trimming, molding, forming, and grinding. In some embodiments, the plurality of angled sides 116 may be on the loading point 202 or unloading point 300 of the conveyor assembly 112.

In some embodiments, the plurality of angled sides 116 of the first side 104 of the induction board 100 may be configured to enable placement of the one or more packages 200 over the loading point 202 of the conveyor assembly 112. In some embodiments, the plurality of angled sides 116 of the first side 104 of the induction board 100 may be configured to enable picking of the one or more packages 200 from the unloading point 300 of the conveyor assembly 112. In some embodiments, the plurality of angled sides 116 of the first side 104 may be configured to provide a plurality of positions for the user 204 to receive or place the one or more packages 200. In one example, the plurality of positions may correspond to a distance of the user 204 from the induction board 100 and positioning of the user 204 with respect to the induction board 100 while receiving the one or more packages 200 from the conveyor assembly 112 or placing the one or more packages 200 over the conveyor assembly 112. In another example, the plurality of positions may correspond to various angles of the user 204 corresponding to the induction board 100 and positioning of the user 204 with respect to the induction board 100 while receiving the one or more packages 200 from the conveyor assembly 112 or placing the one or more packages 200 over the conveyor assembly 112.

In some embodiments, the plurality of angled sides 116 may comprise a first angled side 118 and a second angled side 120. Further, the first angled side 118 of the plurality of angled sides 116 may be connected with the second angled side 120 of the plurality of angled sides 116. In some embodiments, the first angled side 118 and the second angled side 120 may define the V-shape. In some embodiments, the first angled side 118 and the second angled side 120 of the plurality of sides may be monolithic with the first side 104 of the induction board 100.

In some embodiments, each of the plurality of angled sides 116 may have a first sloped edge 122. In some embodiments, the first sloped edge 122 may ensure a smooth translation of the one or more packages 200 from the conveyor assembly 112 to the induction board 100 or from the induction board 100 to the conveyor assembly 112. In some embodiments, the first sloped edge 122 of the each of the plurality of angled sides 116 of the first side 104 may be constructed in a predefined shape. In some embodiments, the shape of the first sloped edge 122 of the each of the plurality of angled sides 116 may correspond to a chamfered or beveled shape. In some embodiments, the first sloped edge 122 may be fabricated with one or more processes that may include but not limited to a sanding process, molding, forming, grinding, cutting, etc.

In some embodiments, the induction board 100 may comprise the second side 106. In one example, the second side 106 of the induction board 100 may correspond to a left side. In some embodiments, the second side 106 of the induction board 100 may be coplanar with one side of the conveyor assembly 112. In some embodiments, the second side 106 of the induction board 100 may define a breadth of the induction board 100. In some embodiments, the second side 106 of the induction board 100 may be securely coupled with the one side of the conveyor belt 114 of the conveyor assembly 112. In some embodiments, the second side 106 of the induction board 100 may comprise a plurality of apertures 124. In some embodiments, the plurality of apertures 124 of the second side 106 of the induction board 100 may be configured to equip one or more fasteners.

In one example, each of the plurality of apertures 124 may be fabricated on the second side 106 of the induction board 100 through a drilling process. In one example, each of the plurality of apertures 124 may be fabricated with a plurality of internal threads (not shown). In one example, the plurality of internal threads may be fabricated within each of the plurality of apertures 124 through at least one tapping tool. In one example, the one or more fasteners may be configured to be fastened into the plurality of apertures 124 through the plurality of internal threads to fasten the second side 106 of the induction board 100 with the conveyor assembly 112. In some embodiments, each of the plurality of apertures 124 may be configured to properly accommodate the one or more fasteners. In some embodiments, the one or more fasteners may comprise a plurality of external threads. Further, the plurality of external threads may be configured to interlock with the plurality of internal threads of each of the plurality of apertures 124.

In some embodiments, the second side 106 of the induction board 100 may further comprise a second sloped edge 126. Further, the second sloped edge 126 of the second side 106 of the induction board 100 may be configured to enable transportation of the one or more packages 200 from the induction board 100 to the conveyor assembly 112 while standing in proximity to the second side 106 of the induction board 100. In some embodiments, the second sloped edge 126 may be fabricated through one or more processes. Further, the one or more processes may include but not limited to a sanding process, molding, forming, cutting process, etc.

In some embodiments, the induction board 100 may comprise the third side 108. In one example, the third side 108 of the induction board 100 may correspond to the right side of the induction board 100. In some embodiments, the third side 108 of the induction board 100 may be coplanar with the conveyor belt 114 of the conveyor assembly 112. In some embodiments, the third side 108 of the induction board 100 may be parallel to the second side 106 of the induction board 100. In some embodiments, the third side 108 of the induction board 100 may be securely coupled with the conveyor belt 114 of the conveyor assembly 112. In some embodiments, the third side 108 of the induction board 100 may comprise the plurality of apertures 124. In some embodiments, the plurality of apertures 124 of the third side 108 of the induction board 100 may be configured to equip the one or more fasteners.

In one example, the one or more fasteners may be configured to be fastened into the plurality of apertures 124 of the third side 108 through the plurality of internal threads to fastened the third side 108 of the induction board 100 with the conveyor assembly 112. In some embodiments, each of the plurality of apertures 124 may be configured to properly accommodate the one or more fasteners. In some embodiments, the third side 108 of the induction board 100 may further comprise a third sloped edge 128. Further, the third sloped edge 128 of the third side 108 of the induction board 100 may be configured to enable transportation of the one or more packages 200 from the induction board 100 to the conveyor assembly 112 while standing in proximity to the third side 108 of the induction board 100. In some embodiments, the third sloped edge 128 may be fabricated through one or more processes. Further, the one or more processes may include but not limited to a sanding process, cutting process, etc.

In some embodiments, the induction board 100 may comprise the fourth side 110. Further, the fourth side 110 may be positioned opposite to the first side 104. In some embodiments, the fourth side 110 of the induction board 100 may correspond to a rear side of the induction board 100. In some embodiments, the fourth side 110 of the induction board 100 may be configured to connect the second side 106 of the induction board 100 with the third side 108 of the induction board 100. In some embodiments, the fourth side 110 of the induction board 100 may be parallel with the first side 104 of the induction board 100. In some embodiments, the fourth side 110 of the induction board 100 may further comprise a fourth sloped edge 132. Further, the fourth sloped edge 132 of the fourth side 110 of the induction board 100 may be configured to enable transportation of the one or more packages 200 from the induction board 100 to the conveyor assembly 112 while standing in proximity to the fourth side 110 of the induction board 100. In some embodiments, the fourth side 110 of the induction board 100 may comprise a pair of curve shaped corner edges. Each curve shaped corner edge may connect the fourth side 110 with the second side 106 and the third side 108, respectively.

In some embodiments, the fourth side 110 of the induction board 100 may comprise an extended portion 130. Further, the extended portion 130 may be monolithic with the fourth side 110 of the induction board 100. Further, the extended portion 130 of the fourth side 110 of the induction board 100 may be constructed with a shape that may include but not limited to a V-shaped, a U-shape, etc. Further, the extended portion 130 of the fourth side 110 may configured to rest over an edge of the conveyor assembly 112. In some embodiments, the extended portion 130 of the fourth side 110 may be configured to enable the user 204 to maintain a predefined distance from the conveyor belt 114 of the conveyor assembly 112.

As illustrated in FIG. 1D, the conveyor system 102 may comprise the conveyor assembly 112. In some embodiments, the conveyor assembly 112 may be configured to transport the one or more packages 200 to the induction board 100. In some embodiments, the conveyor assembly 112 may comprise the conveyor belt 114. Further, the induction board 100 may be installed on the loading point 202 or the unloading point 300 of the conveyor assembly 112. Further, when the conveyor belt 114 may be installed on the loading point 202, the one or more packages 200 may be placed by the user 204 over the induction board 100 and translate the one or more packages 200 to the conveyor belt 114 through the first sloped edge 122 of the plurality of angled sides 116 of the first side 104. Further, the conveyor belt 114 may be configured to transport the one or more packages 200 along the conveyor belt 114 of the conveyor assembly 112. In some embodiments, the conveyor assembly 112 may further comprise a pair of longitudinal side rails 134, and a bridge section 136. Further, the pair of longitudinal side rails 134 may be configured to prevent falling of the one or more packages 200 while moving over the conveyor belt 114 of the conveyor assembly 112. In some embodiments, the bridge section 136 of the conveyor assembly 112 may be configured to enable installation of one or more accessories such as scanners, sensors, lights, etc. with the conveyor assembly 112.

Figure 2A:
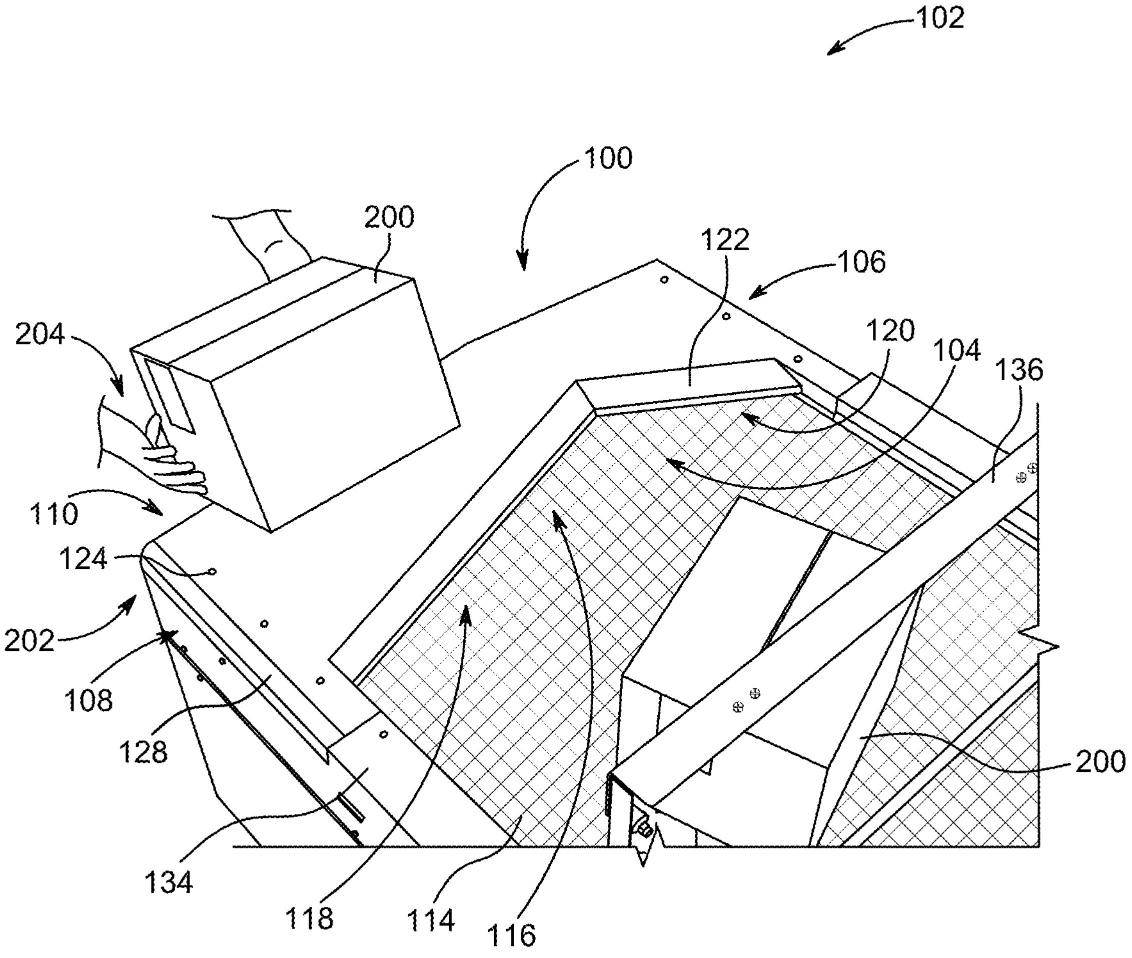
FIG. 2A illustrates a perspective view of one or more packages being placed over the induction board of the conveyor system by a user in accordance with an example embodiment of the present disclosure.
Figure 2B:
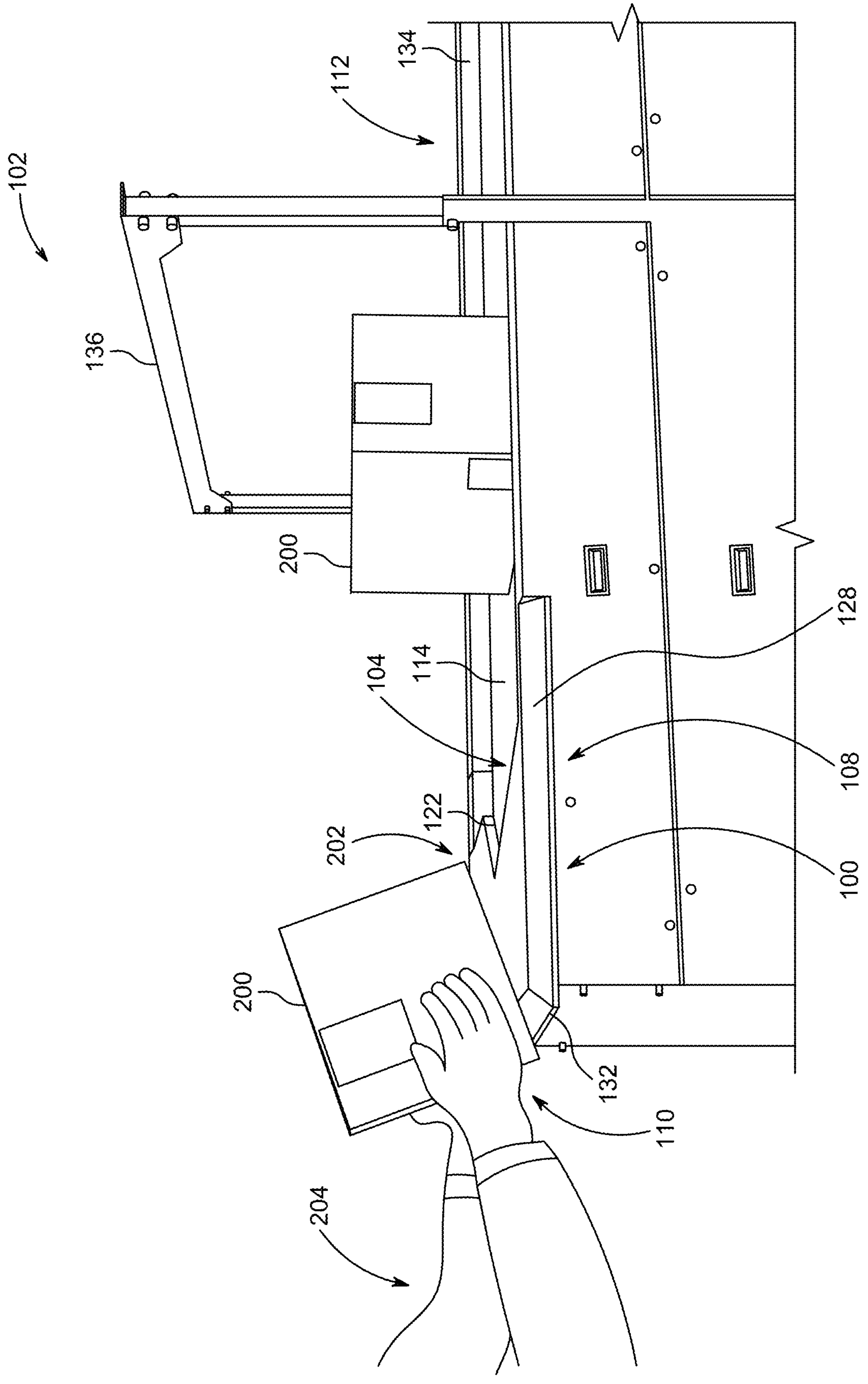
FIG. 2B illustrates a side view of one or more packages being placed over the induction board of the conveyor system by a user, in accordance with an example embodiment of the present disclosure.
Figure 2C:
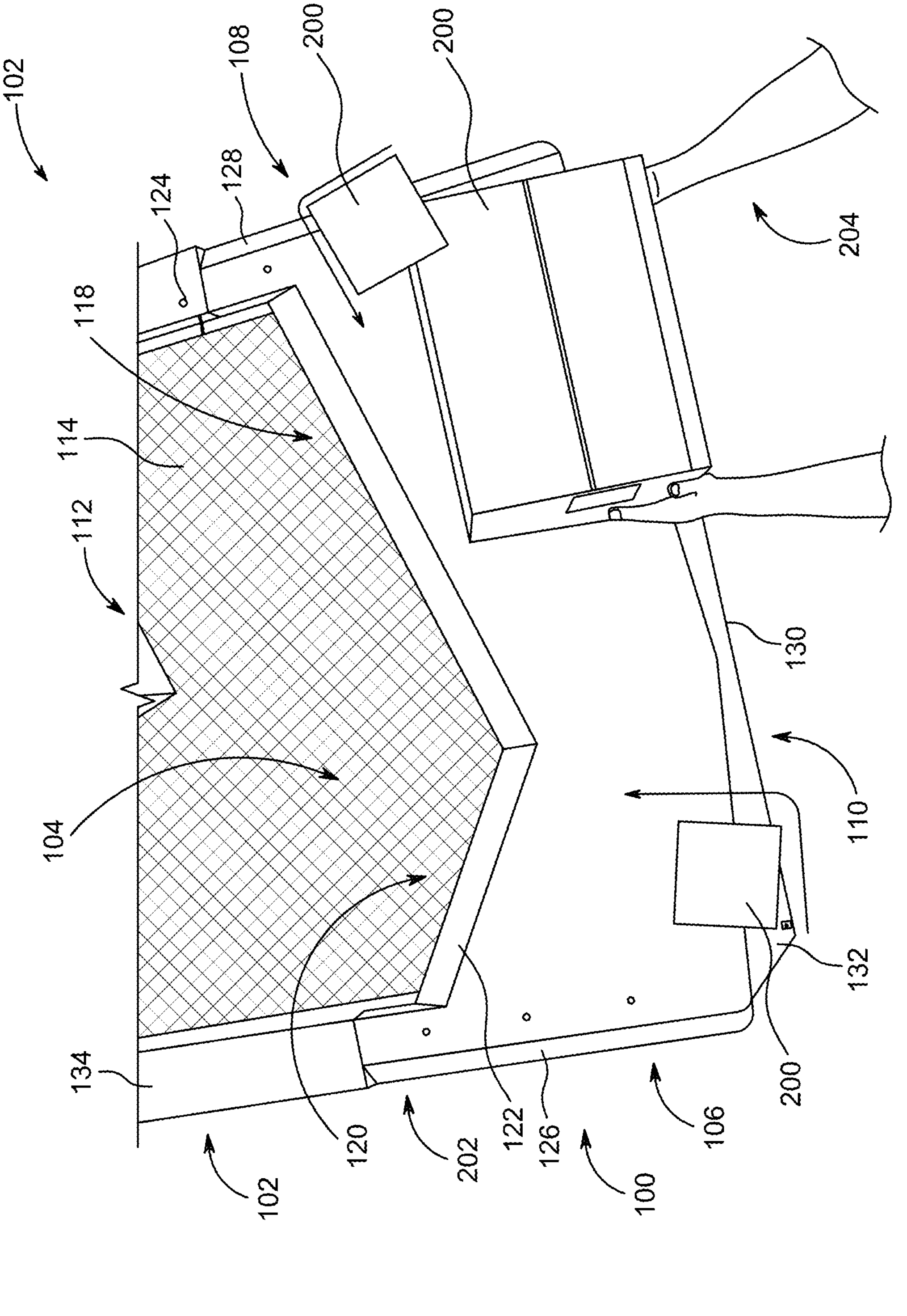
FIG. 2C illustrates a top view of one or more packages being placed over the induction board of the conveyor system by a user in accordance with an example embodiment of the present disclosure.
Figure 3:
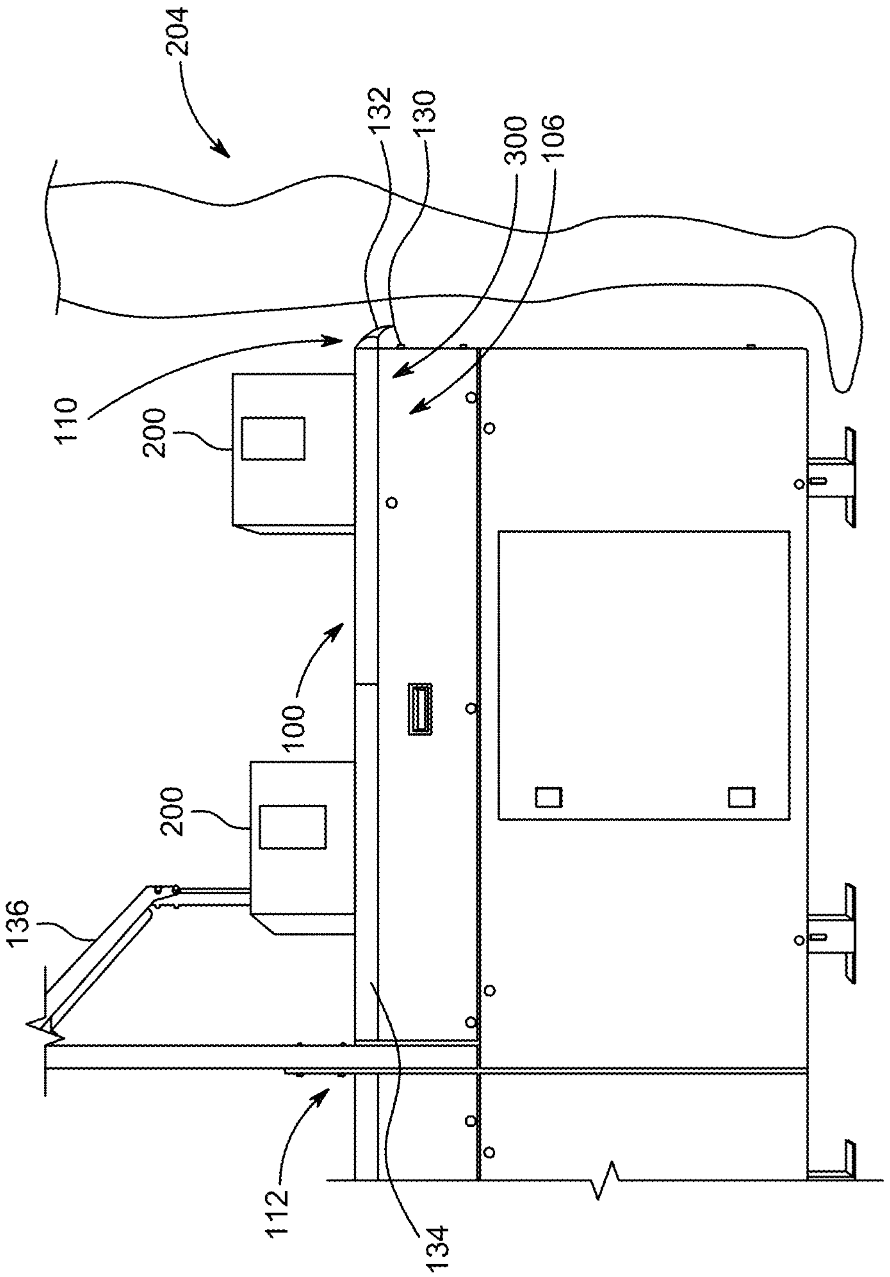
FIG. 3 illustrates a side view of one or more packages being received from the induction board of the conveyor system by a user in accordance with an example embodiment of the present disclosure.

FIG. 2A illustrates a perspective view of the one or more packages 200 being placed over the induction board 100 of the conveyor system 102 by the user 204, in accordance with an example embodiment of the present disclosure. FIG. 2B illustrates a side view of the one or more packages 200 being placed over the induction board 100 of the conveyor system 102 by the user 204, in accordance with an example embodiment of the present disclosure. FIG. 2C illustrates a top view of the one or more packages 200 being placed over the induction board 100 of the conveyor system 102 by the user 204, in accordance with an example embodiment of the present disclosure.

In one example, when the induction board 100 may be coupled with the conveyor assembly 112 on or proximate to the loading point 202, the one or more packages 200 may be placed on the conveyor belt 144 of the conveyor assembly 112 from the second side 106, the third side 108, or the fourth side 110 of the induction board 100. In some embodiments, when the user 204 may be in proximity to the second side 106 of the induction board 100, the one or more packages 200 may be placed by the user 204 on the second sloped edge 126 of the second side 106 of the induction board 100. In some embodiments, when the user 204 may be in proximity to the third side 108 of the induction board 100, the one or more packages 200 may be placed by the user 204 on the third sloped edge 128 of the third side 108 of the induction board 100. In some embodiments, when the user 204 may be in proximity to the fourth side 110 of the induction board 100, the one or more packages 200 may be placed by the user 204 on the fourth sloped edge of the fourth side 110 of the induction board 100. In some embodiments, the first sloped edge 122 of each of the angled sides 116 of the first side 104, the second sloped edge 126 of the second side 106, the third sloped edge 128 of the third side 108, and the fourth sloped edge of the fourth side 110 may be configured to provide a smooth transition of the one or more packages 200 off the induction board 100 (as illustrated in FIG. 2B).

FIG. 3 illustrates a side view of the one or more packages 200 being received from the induction board 100 of the conveyor system 102 by the user 204, in accordance with an example embodiment of the present disclosure.

In one example, when the induction board 100 may be coupled with the conveyor assembly 112 on or proximate to the unloading point 300, the one or more packages 200 may be translated from the conveyor belt 114 of the conveyor assembly 112 to the induction board 100 from the first side 104 of the induction board 100. In some embodiments, the first sloped edge 122 of the first side 104 may be configured to enabled translation of the one or more packages 200 from the conveyor belt 114 to the induction board 100. Further, the one or more packages 200 received by the user 204 from the second side 106, the third side 108, or the fourth side 110 of the induction board 100. In some embodiments, when the user 204 may be in proximity to the second side 106 of the induction board 100, the one or more packages 200 may be picked by the user 204 from the second sloped edge 126 of the second side 106 of the induction board 100. In some embodiments, when the user 204 may be in proximity to the third side 108 of the induction board 100, the one or more packages 200 may be picked by the user 204 from the third sloped edge 128 of the third side 108 of the induction board 100. In some embodiments, when the user 204 may be in proximity to the fourth side 110 of the induction board 100, the one or more packages 200 may be picked by the user 204 from the fourth sloped edge of the fourth side 110 of the induction board 100. In some embodiments, the first sloped edge 122 of each of the angled sides 116 of the first side 104, the second sloped edge 126 of the second side 106, the third sloped edge 128 of the third side 108, and the fourth sloped edge of the fourth side 110 may be configured to provide a smooth transition of the one or more packages 200 from the induction board 100.

Figure 4A:
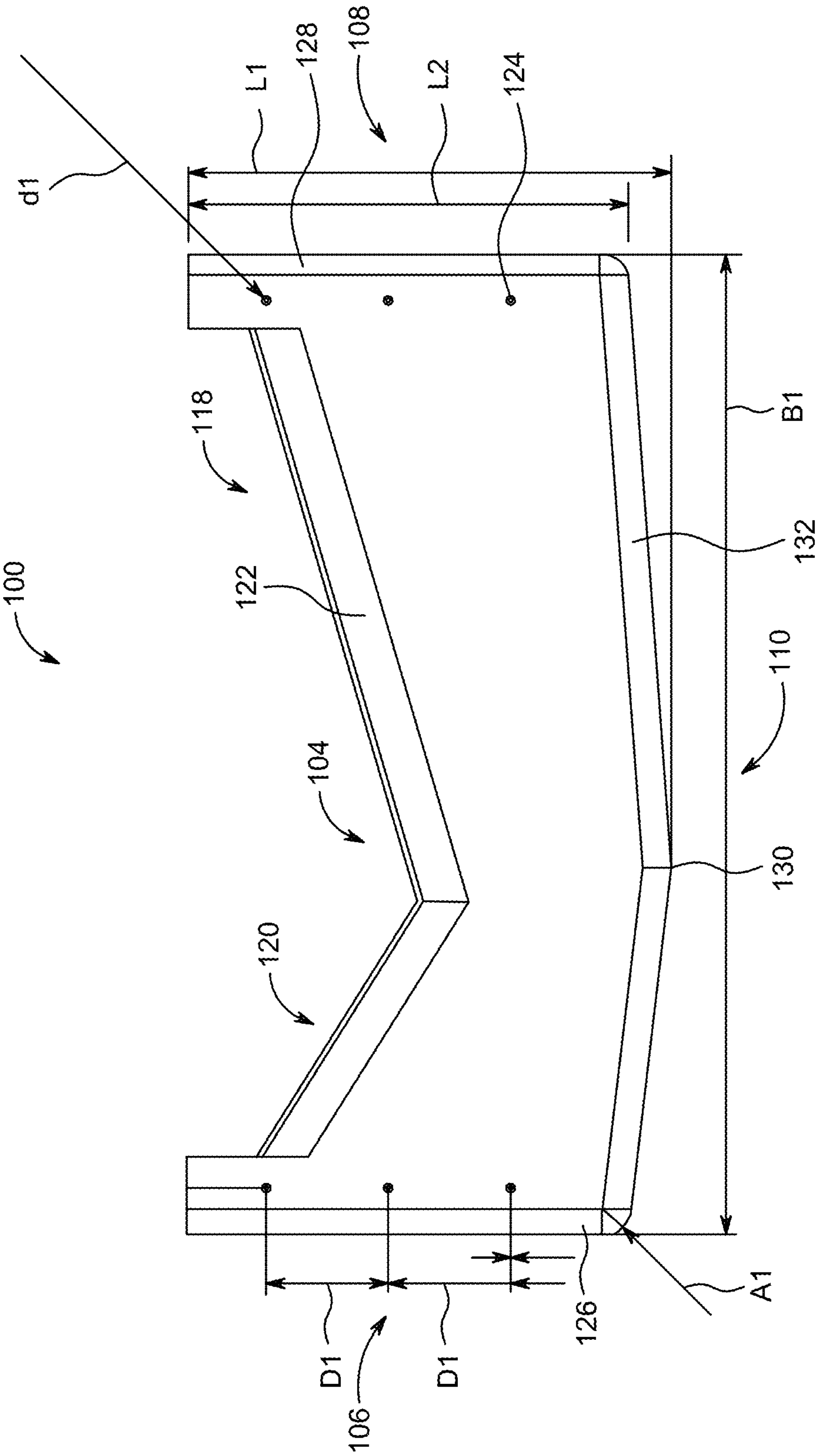
FIG. 4A illustrates a top view of the induction board showing one or more dimensions of the induction board in accordance with an example embodiment of the present disclosure.
Figure 4B:
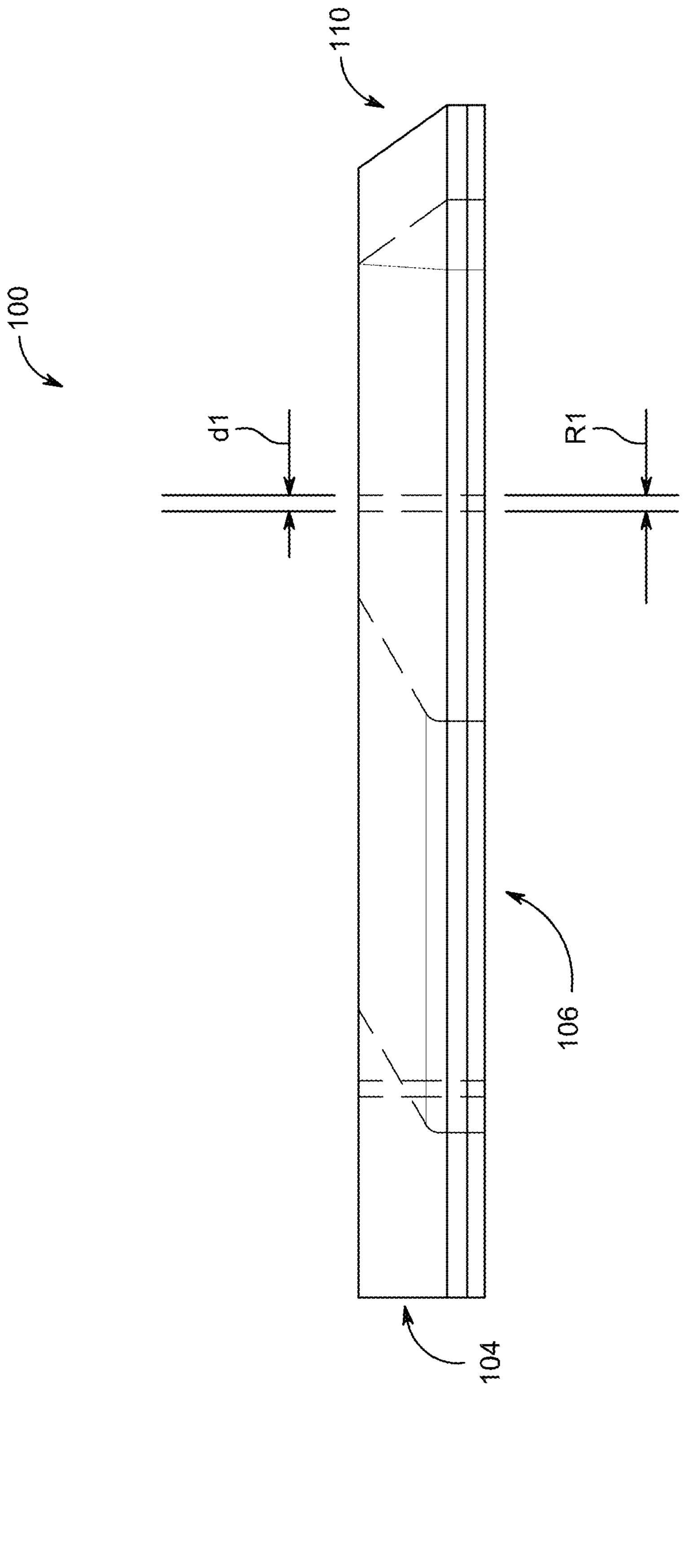
FIG. 4B illustrates a left side view of the induction board showing one or more dimensions of the induction board in accordance with an example embodiment of the present disclosure.
Figure 4C:
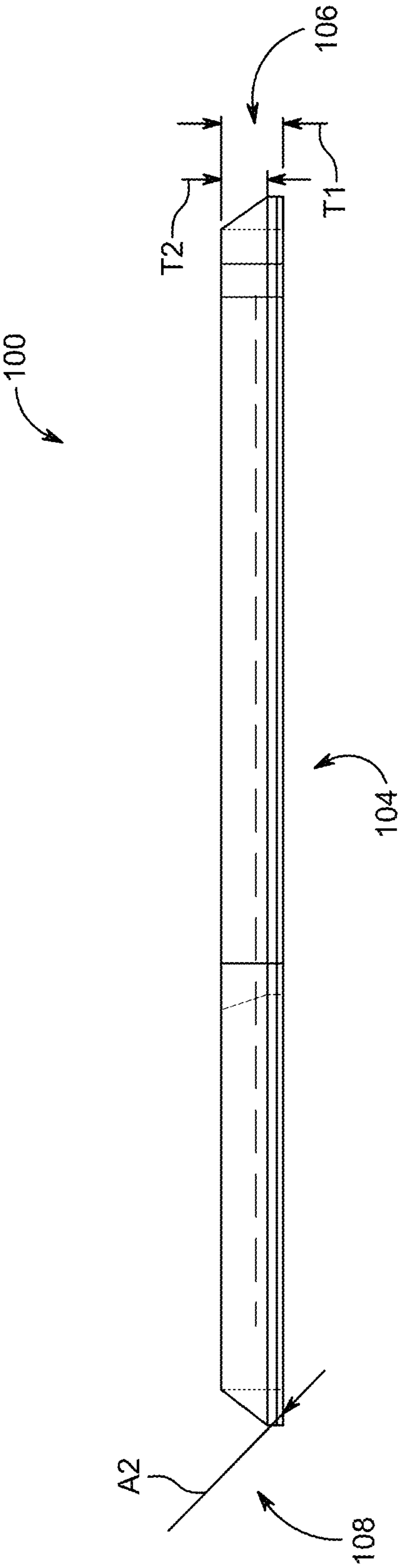
FIG. 4C illustrates a front view of the induction board showing one or more dimensions of the induction board in accordance with an example embodiment of the present disclosure.
Figure 4D:
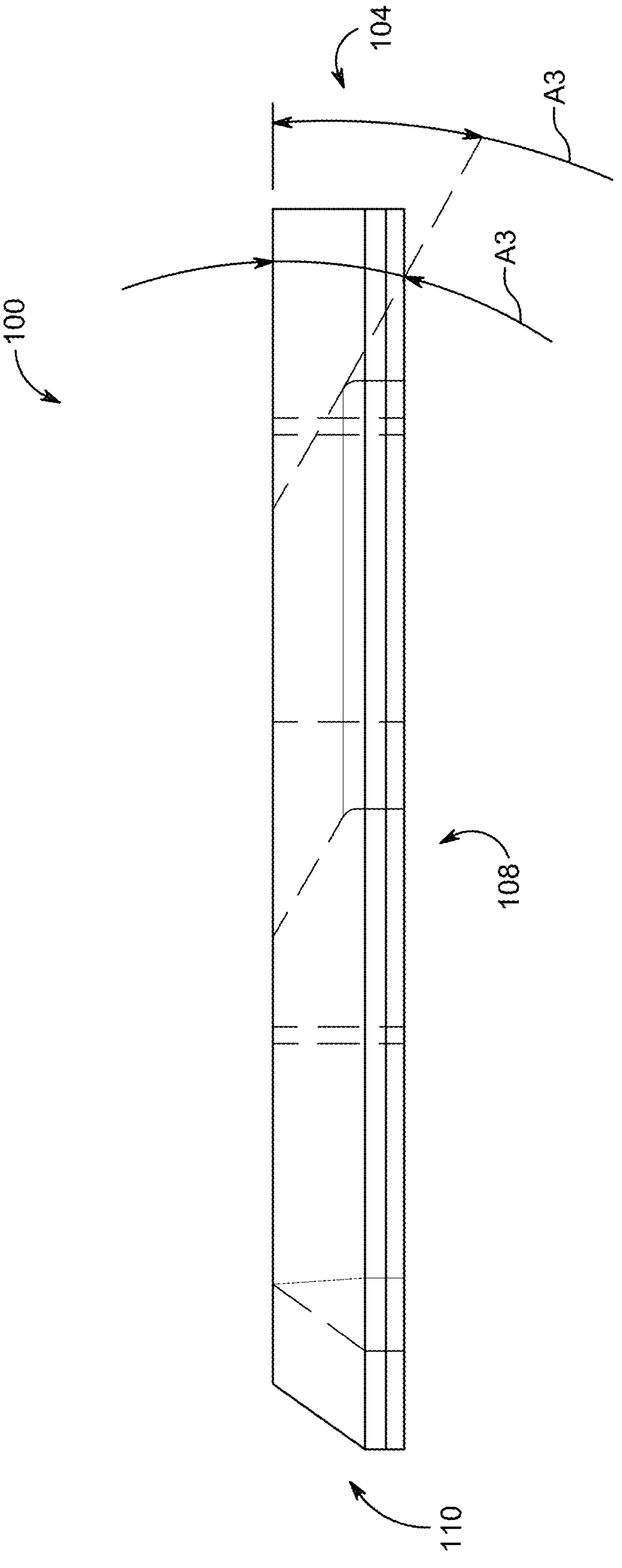
FIG. 4D illustrates a right side view of the induction board showing one or more dimensions of the induction board in accordance with an example embodiment of the present disclosure.
Figure 4E:
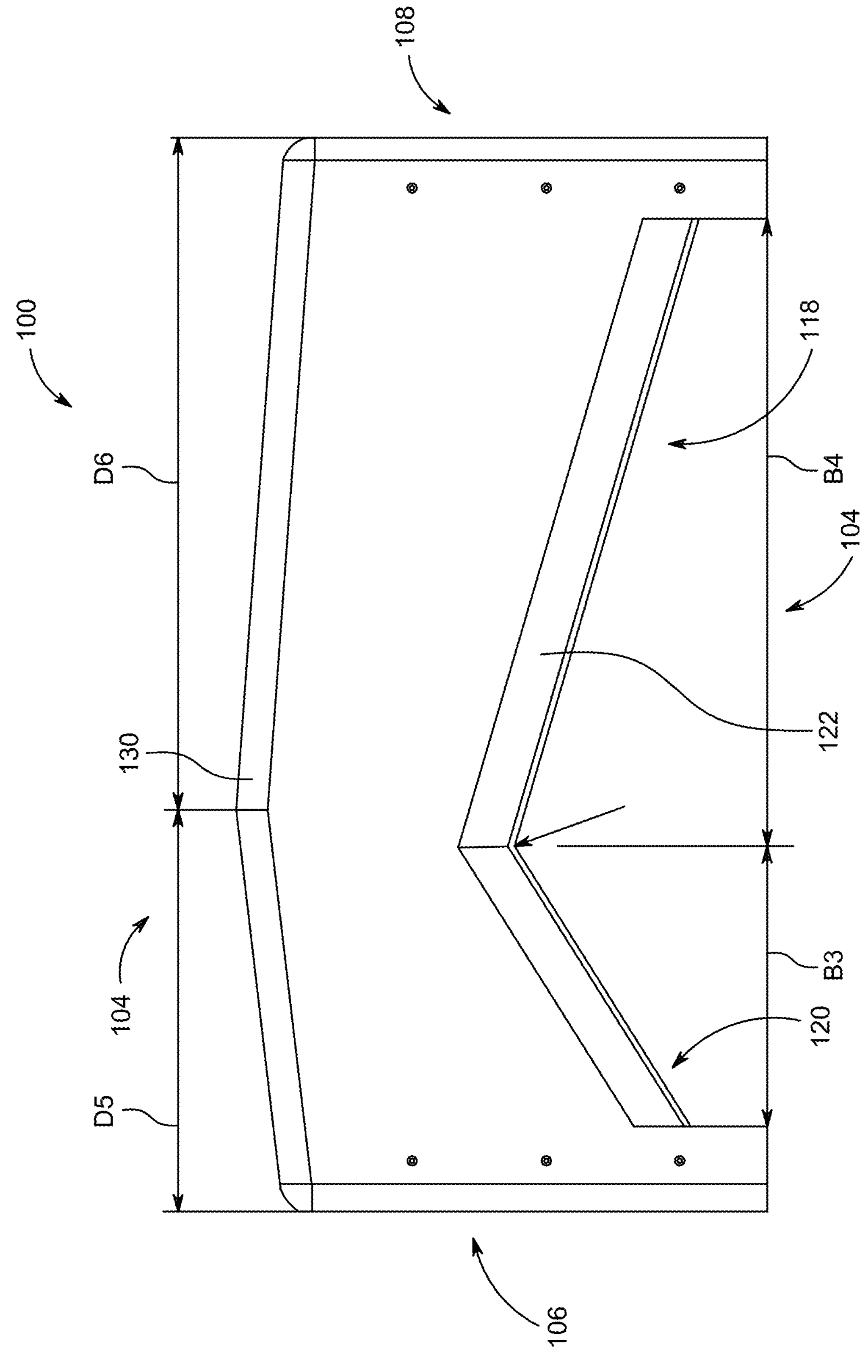
FIG. 4E illustrates a bottom view of the induction board showing one or more dimensions of the induction board in accordance with an example embodiment of the present disclosure.

FIG. 4A illustrates a top view of the induction board 100 showing one or more dimensions of the induction board 100, in accordance with an example embodiment of the present disclosure. FIG. 4B illustrates a left side view of the induction board 100 showing one or more dimensions of the induction board 100, in accordance with an example embodiment of the present disclosure. FIG. 4C illustrates a front view of the induction board 100 showing one or more dimensions of the induction board 100, in accordance with an example embodiment of the present disclosure. FIG. 4D illustrates a right side view of the induction board 100 showing one or more dimensions of the induction board 100, in accordance with an example embodiment of the present disclosure. FIG. 4E illustrates a bottom view of the induction board 100 showing one or more dimensions of the induction board 100, in accordance with an example embodiment of the present disclosure.

In some embodiments, the induction board 100 may define the one or more dimensions having a length and a breadth. Further, the induction board 100 may define the length of L1—81 centimeters (cm). Further, the induction board 100 may define the breadth of B1—166 cm. In some embodiments, the first side 104 of the induction board 100 may also define a breadth similar to B1—166 cm. In some embodiments, the second side 106 of the induction board 100 may define a length of L2—74.3 cm. In some embodiments, the third side 108 of the induction board 100 may define a length similar to L2—74.3 cm. In some embodiments, the fourth side 110 of the induction board 100 may also define a length similar to L1—166 cm. In some embodiments, each of the plurality of apertures 124 may be separated by a distance of D1—20 cm. Further, each of the plurality of apertures 124 may define a diameter of d1—8 mm. In some embodiments, the first angled side 118 and the second angled side 120 form an angle. Further, the angle may be 130 degrees. In some embodiments, the angle formed by the first angled side 118 and the second angled side 120 may define the V shape.

In some embodiments, the first sloped edge 122 of each of the angled sides 116 of the first side 104 may be chamfered at a predefined angle. Further, the predefined angle may correspond to A1—19.23 degrees. In some embodiments, each of the plurality of apertures 124 may define a diameter of d1—8 mm and a radius of R1—4 mm (as illustrated in FIG. 4A). In some embodiments, each edge of the first side 104 of the induction board 100 may define a fillet radius A2—10 mm (as illustrated in FIG. 4C). In some embodiments, the first side 104 of the induction board 100 may define a thickness of T1—51 mm including the thickness of the first sloped edge 122. In some embodiments, the first side 104 of the induction board 100 may define a thickness of T2—40 mm excluding the thickness of the first sloped edge 122. In some embodiments, the first sloped edge 122 and the second sloped edge 126 of the plurality of angled sides 116 may define an angle of A3—19.23 degrees (as illustrated in FIG. 1B).

In some embodiments, the first sloped edge 122 of the plurality of angled sides 116 may define a breadth of B3—43 cm. In some embodiments, the second sloped edge 126 of the plurality of angled sides 116 may define a breadth of B4—94 cm. In some embodiments, a distance between the extended portion 130 of the fourth side 110 of the induction board 100 and the second side 106 of the induction board 100 may correspond to D5—625.77 mm. In some embodiments, a distance between the extended portion 130 of the fourth side 110 of the induction board 100 and the third side 108 of the induction board 100 may correspond to D6—1037.23 mm (as illustrated in FIG. 4E).

In some embodiments, a method for assembling the induction board 100 within the conveyor system 102 may comprises a plurality of operations. Firstly, the induction board 100 may be fastened at or proximate to the loading point 202 or at the unloading point 300 of the conveyor assembly 112 from the first side 104 of the induction board 100. Further, the first side 104 of the induction board 100 may be positioned over the conveyor system 102. Further, the first side 104 of the induction board 100 may be fabricated with the plurality of angled sides 116. Further, each of the plurality of angled sides 116 may have the first sloped edge 122. Further, the induction board 100 may further comprise the second side 106 having the second sloped edge 126 and the third side 108 having the third sloped edge 128. Further, the second side 106 may be positioned parallel to the third side 108. Further, the fourth side 110 may be positioned opposite to the first side 104. Further, the fourth side 110 may comprise the fourth sloped edge. Further, the fourth side 110 may be connected to the second side 106 and the third side 108 of the induction board 100. Further, the plurality of angled sides 116 of the first side 104 may be configured to allow a user 204 to receive or place the one or more packages 200 from or on the conveyor assembly 112 from the second side 106, the third side 108 or the fourth side 110 of the induction board 100. Further, the first sloped edge 122 of each of the angled sides 116 of the first side 104, the second sloped edge 126 of the second side 106, the third sloped edge 128 of the third side 108, and the fourth sloped edge of the fourth side 110 may be configured to provide the smooth transition of the one or more packages 200 from or off the induction board 100.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An induction board for a conveyor system, the induction board comprising:

a first side fabricated with a plurality of angled sides, wherein each of the plurality of angled sides have a first sloped edge;

a second side having a second sloped edge and a third side having a third sloped edge, wherein the second side is parallel to the third side; and a fourth side positioned opposite to the first side, the fourth side having a fourth sloped edge, wherein the fourth side connects to the second side and the third side, wherein the plurality of angled sides of the first side are configured to allow a user to receive or place one or more packages from or on the conveyor system from the second side, the third side, or the fourth side, and wherein each of the first sloped edge of each of the plurality of angled sides of the first side, the second sloped edge of the second side, the third sloped edge of the third side, and the fourth sloped edge of the fourth side are configured to provide a smooth transition of the one or more packages from and off the induction board.

2. The induction board of claim 1, wherein the induction board defines a dimension having a length and a breadth, wherein the length corresponds to 81 centimeters (cm) and the breadth corresponds to 166 cm.

3. The induction board of claim 1, wherein the plurality of angled sides of the first side are configured to provide a plurality of positions for the user to receive or place the one or more packages.

4. The induction board of claim 1, wherein the plurality of angled sides of the first side comprises a first angled side and a second angled side, wherein the first angled side and the second angled side form an angle, wherein the angle corresponds to 130 degrees.

5. The induction board of claim 4, wherein the angle formed by the first angled side and the second angled side defines a V shape.

6. The induction board of claim 1, wherein the first sloped edge of each of the plurality of angled sides of the first side are chamfered at a predefined angle, wherein the predefined angle corresponds to 50 degrees.

7. The induction board of claim 1, wherein the second side and the third side of the induction board comprises a plurality of apertures.

8. The induction board of claim 7, wherein the plurality of apertures are configured to equip one or more fasteners, wherein the one or more fasteners are configured to mount the induction board with the conveyor system.

9. The induction board of claim 1, wherein the induction board is fastened at a loading point or at an unloading point of the conveyor system and the first side of the induction board is positioned over the conveyor system.

10. The induction board of claim 1, wherein the fourth side of the induction board is monolithic with an extended portion, wherein the extended portion is configured to rest over an edge of the conveyor system.

11. The induction board of claim 10, wherein the extended portion is configured to enable the user to maintain a predefined distance from the conveyor system.

12. A conveyor system comprising:

a conveyor assembly comprising a conveyor belt; and an induction board coupled to the conveyor assembly and positioned over the conveyor belt, wherein the induction board comprises:

a first side fabricated with a plurality of angled sides, wherein each of the plurality of angled sides have a first sloped edge;

a second side having a second sloped edge and a third side having a third sloped edge, wherein the second side is parallel to the third side; and a fourth side positioned opposite to the first side, the fourth side having a fourth sloped edge, wherein the fourth side connects to the second side and the third side, wherein the plurality of angled sides of the first side are configured to allow a user to receive or place one or more packages from or on the conveyor system from the second side, the third side, or the fourth side, and wherein each of the first sloped edge of each of the plurality of angled sides of the first side, the second sloped edge of the second side, the third sloped edge of the third side, and the fourth sloped edge of the fourth side are configured to provide a smooth transition of the one or more packages from and off the induction board.

13. A method comprising:

fastening an induction board at a loading point or at an unloading point of a conveyor system from a first side of the induction board, wherein the first side of the induction board is positioned over the conveyor system, wherein the induction board further comprising:

the first side fabricated with a plurality of angled sides, wherein each of the plurality of angled sides have a first sloped edge;

a second side having a second sloped edge and a third side having a third sloped edge, wherein the second side is parallel to the third side; and a fourth side positioned opposite to the first side, the fourth side having a fourth sloped edge, wherein the fourth side connects to the second side and the third side, wherein the plurality of angled sides of the first side are configured to allow a user to receive or place one or more packages from or on the conveyor system from the second side, the third side, or the fourth side, and wherein each of the first sloped edge of each of the plurality of angled sides of the first side, the second sloped edge of the second side, the third sloped edge of the third side, and the fourth sloped edge of the fourth side are configured to provide a smooth transition of the one or more packages from and off the induction board.

14. The method of claim 13, wherein the induction board defines a dimension having a length and a breadth, wherein the length corresponds to 81 centimeters (cm) and the breadth corresponds to 166 cm.

15. The method of claim 13, wherein the plurality of angled sides of the first side is configured to provide a plurality of positions for the user to receive or place the one or more packages.

16. The method of claim 13, wherein the plurality of angled sides of the first side comprises a first angled side and a second angled side, wherein the first angled side and the second angled side form an angle, wherein the angle corresponds to 130 degrees.

17. The method of claim 16, wherein the angle formed by the first angled side and the second angled side defines a V shape.

18. The method of claim 13, wherein the first sloped edge of each of the plurality of angled sides of the first side are chamfered at a predefined angle, wherein the predefined angle corresponds to 50 degrees.

19. The method of claim 13, wherein the second side and the third side of the induction board comprises a plurality of apertures, wherein the plurality of apertures are configured to equip one or more fasteners, wherein the one or more fasteners are configured to mount the induction board with the conveyor system.

20. The method of claim 13, wherein the fourth side of the induction board is monolithic with an extended portion, wherein the extended portion is configured to rest over an edge of the conveyor system, wherein the extended portion is configured to enable the user to maintain a predefined distance from the conveyor system.

* * * * *